March 29, 1966     I. J. LUBALIN     3,242,539

MOULDS AND A METHOD OF PREPARING SAME

Original Filed July 3, 1963

INVENTOR.
IRWIN J. LUBALIN

BY Kenway, Jenney & Hildreth

ATTORNEYS

United States Patent Office 3,242,539
Patented Mar. 29, 1966

3,242,539
MOULDS AND A METHOD OF PREPARING SAME
Irwin J. Lubalin, Plainview, N.Y., assignor to British Industries Corporation, Plainview, N.Y., a corporation of New York
Continuation of application Ser. No. 292,655, July 3, 1963. This application Apr. 26, 1965, Ser. No. 456,877
16 Claims. (Cl. 22—193)

This application is a continuation of my application Serial No. 292,655 filed July 3, 1963, now abandoned.

My invention concerns moulds and a method of preparing moulds for castings. In particular, my invention relates to a composite refractory lined mould and a method of preparing and employing these moulds for forming precision metal castings by the Shaw process.

The Shaw process, as set forth, for example, in U.S. Patents 2,795,022 and 2,811,760 and others comprises subjecting a slurry of a comminuted refractory material in a gellable silicate binder to immediate thermal shock by ignition or by rapid heating at high temperatures of the gelled mass. In one embodiment, the binder comprises an acidified alcosol of silica obtained by the hydrolysis of a lower alkyl silicate with an aqueous acid, together with an alkaline gelling accelerator to hasten gelling of the binder. The slurry of refractory material and binder is poured over a pattern and allowed to become a gelled mass. This mass is then removed from the forming pattern and immediately ignited to subject the mass to thermal shock and remove the volatile materials. The mould prepared in this manner is characterized by a gas porous structure having a plurality of fine microcracks or microcrazings, and is dimensionally stable at metal casting temperatures. This structure permits highly precise metal castings to be prepared employing this type of ceramic mould, since the metal does not enter the microcracks, but entrapped gases in the moulds during the casting operation are permitted to escape through the microcracks.

My invention concerns in one aspect novel composite moulds having a rigid backing and a relatively thin facing of a refractory material prepared by the Shaw process. My moulds are characterized, in one embodiment, by comprising two separately formed mould elements which may be hingedly connected, so that after formation the mould elements may be placed in a closed mating cooperative fluid tight engagement. These moulds are suitable for preparing precision metal castings.

The method of preparing these moulds and the moulds themselves promote economic advantages in the use of the refractory material and binder. For example, my moulds permit the use of relatively thin ceramic facings such as ⅟₁₆ to ½ inch, since the rigid backing of my moulds permits the facing itself to have little inherent mechanical strength. Because there is no actual handling in the foundry of the ceramic shell itself, much less concentrated and, therefore, lower cost silicate binders can be employed in preparing these moulds. Accordingly, any gellable silicate binder can be employed now, either an alcohol or aqueous slurry containing flammable or nonflammable volatiles, and the silicate binder concentration normally about 15 to 25 weight percent can be as low as 5 to 10 weight percent.

A further advantage of my invention resides in the continued reuse of the rigid backing elements. In the past, packed sand was employed as a backing for a ceramic facing. The preparation of the gas porous sand backed moulds was time consuming, and required that the mould be broken up before the sand could be recovered for reuse. Rigid metal contoured backing flask assemblies of my invention are readily adapted to an automated operation of producing moulds for metal castings, since these backing flasks may be continually reused with little difficulty in obtaining segregation of the backing and facing material.

Additional advantages of my invention include the rapid filling of the flasks and preparation of the moulds since the total volume of ceramic to be poured for a thin layer is smaller than conventional moulding operations. Also the composite mould forms permit a rapid punch out or ejection technique to be employed in removing the finished casting and mould material from the flask assembly thereby facilitating rapid automated production of these moulds.

Briefly the composite moulds of my invention are prepared by adjacently positioning a pair of patterns on a base plate to form a pattern plate assembly. Each pattern is a portion of the desired casting. A parting compound such as wax, a silicone fluid, colloidal graphite, etc. is applied to the face of the pattern plate and male patterns. A rigid flask assembly containing a pair of hingedly connected contoured cavities dimensioned to fit over the corresponding pattern plate is located over the patterns. A predetermined relatively thin open facing cavity exists between the internal surface of the backing flask cavities and the external surface of the patterns corresponding to the desired thickness of the ceramic facing of the mold.

A volatile alcohol or water-containing ceramic slurry is then poured into the open backs of the flasks so as to fill the cavity area between the patterns and the backing where it is allowed to gel and harden. The rigid backing flask assembly with the thin ceramic gelled facing is removed from the pattern plate, turned over and immediately ignited and allowed to burn until all volatiles have been consumed. The composite mould thus formed is then thoroughly baked out, and after cooling the hinged horizontal plane flask elements are placed in a closed mating position and secured by pins or other means to form a composite mould having a metal sprue opening for metal casting. Molten metal is poured into the closed mould and after solidification of the metal the casting is removed by opening the mould. The rigid backing flask is then cleaned of ceramic material by sand blasting and reused in preparing another composite mould.

My invention is illustrated in more detail by the following description taken in conjunction with the attached fragmentary drawings wherein.

My invention will be described in one embodiment by the method of preparing a composite mould for an automotive connecting rod. FIGURES 1 through 5 show a section through an assembly for producing the shank portion of a connecting rod.

Figure 1:
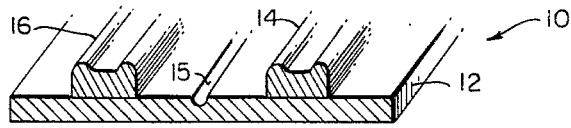
FIGURES 1 through 5 are a sectional illustration of the various steps of my process in preparing a composite mould.

FIGURE 1 shows a pattern assembly 10 including a smooth flat metal base plate 12, on which is secured two adjacently positioned male patterns 14 and 16 of metal, plastic, wood or other suitable hard material. The base may contain, as shown, a longitudinal groove 15 positioned between the patterns to aid in the subsequent rapid and correct registration of a contoured flask assembly 18. Each pattern 14 and 16 represents a detailed model of one half of the connecting rod shank or other casting with suitable sprues and risers attached. A mould release or parting compound is usually applied to the surfaces of the pattern assembly to facilitate the release of the ceramic material from the assembly.

Figure 2:
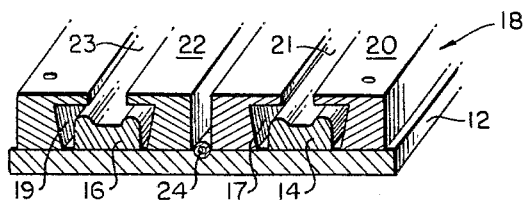

FIGURE 2 shows a rigid metal contoured backing flask assembly 18 consisting of two contoured rigid female elements 20 and 22 connected by hinge 24. The hinge 24 is adapted to fit into groove 15 to insure a correct snug fit between the mating flat surface of the base plate 12 and the flat edge of elements 20 and 22. The backing flask 18 is dimensioned and placed so that each female element 20 and 22 is positioned over its corresponding pattern on the pattern assembly 10. Each female element of the flask 18 has a central cavity roughly shaped to correspond with that of the patterns of the plate assembly, but controlled to leave a facing cavity 17 and 19 between the external surface of the patterns 14 and 16, and the internal surface of the elements 20 and 22 of desired thickness for a refractory facing material. Each element has one or more openings of substantial dimension such as the open slotted backing areas 21 and 23 shown for the introduction of the facing material to the facing cavity. These openings after being filled with the ceramic slurry may be subsequently employed to punch out the finished casting and mould by pneumatic, hydraulic or mechanical means. The internal walls of the cavities of both elements 20 and 22 are machined inwardly at the upper corners in a sloping manner to provide a keying wedge for the refractory facing. This keying wedge permits the thin refractory facing to adhere to the smooth metal internal wall surface of the flask cavities. If desired, other methods of securing the facing material to the facing cavity such as by pins, adhesives, etc. can be employed.

Figure 3:
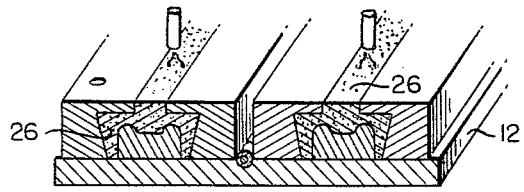

FIGURE 3 shows the cavities 17 and 19 of the backing flask 18 after having a gellable ceramic slurry 26 poured into them. In one embodiment the ceramic slurry can be fluid slurry of graded refractory powder, with a binder of hydrolyzed ethyl silicate and ammonium hydroxide solution as a gelling accelerator. The ceramic slurry 26 poured into the cavities, is permitted to gel and harden to form a refractory facing about 1/16 to 1/2 inch in thickness, having low mechanical strength.

Figure 6:
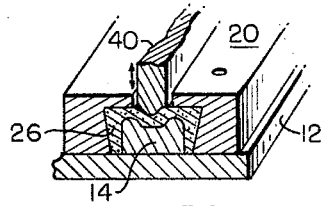
FIGURE 6 is an illustration of a portion of a flask assembly showing a means to further reduce the weight and cost of moulding material.

FIGURE 6 illustrates a method of reducing the cost and the weight of the ceramic slurry 26 in the facing cavities 17 and 19 of the flask assembly 18. FIGURE 6 shows one of the backing elements 20 on the plate 12 after the ceramic slurry 26 has been poured into the facing cavity 17. A preshaped form 40 is inserted into the slurry before gellation has occurred through the open back area 21 of the flask 20. This solid form may be of metal, plastic, wood, etc., and is inserted from above to displace a portion of the heavy slurry. As shown the form may be shaped to provide for the displacement of sufficient slurry from the backing area to give a mould shell of relatively uniform thickness. The form 40 is withdrawn after gellation of the slurry leaving a depression in the back area of the gelled slurry in the flask 20. This depression effectively reduces the weight of this section of the composite mould facing and permits additional savings in the amount of slurry required while giving relatively uniform shell mould thickness.

Figure 4:
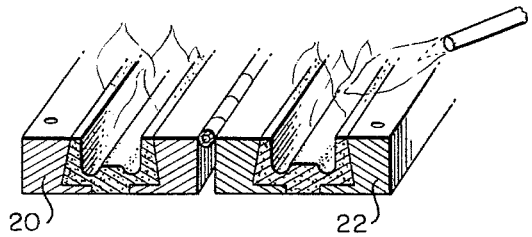

The flask 18 with the gelled facing is then stripped or lifted off the pattern plate assembly 10, inverted into the position shown in FIGURE 4, and placed on a torching table preferably one which permits the free circulation of air about the flask assembly 18. The relatively thin gelled facing is then immediately ingited by means of an air-gas flame, and allowed to burn until all the free alcohol or flammable volatiles are consumed. Where an aqueous non-ignition type Shaw ceramic composition is employed, thermal shock of the ceramic facing to prepare a microcrazed porous facing is obtained by rapidly subjecting the flask and gelled facing to high temperatures.

After ignition or thermal shock treatment the composite mould comprising the rigid flask and thin hardened ceramic facing layer is normally transferred to a bake out oven or placed beneath high intensity open flame gas burners for a period of time sufficient to thoroughly cure the ceramic facing, which involves the removal of all volatile matter and the hardening of the facing.

Figure 5:
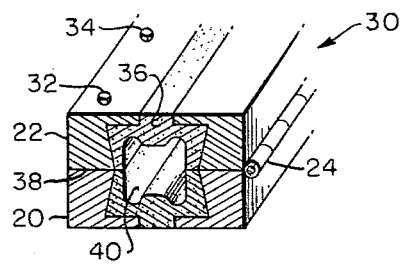

The hinged composite mould 30 is then cooled, and, as shown in FIGURE 5, the elements 20 and 22 are then closed together in a fluid tight mating engagement and secured by pins 32 and 34. The assembled composite mould is thus characterized by an outer rigid backing flask composed of two parts 20 and 22 hingedly connected for mating engagement of these parts in a closed position with a keyed in thin facing of refractory material 36. The refractory material is a continuous thin facing of ceramic on the internal wall surfaces of the backing flask, the facing having a microcrazed porous structure which is a detailed representation of the patterns on which it was formed. If desired, the thickness of the facing cavity may be varied in order to vary the thickness of the thin ceramic shell and promote a desired directional solidification of the casting metal. In a closed position the mould presents an external housing of rigid metal with a thin interior lining of ceramic, the ceramic and flask of each part evenly meeting in a fluid tight manner along a line 33. The composite mould 30 prepared in this manner is now a strong structure capable of being used to cast a metal connecting rod.

In the casting operation molten metal is poured into the open end 40 of the closed mould 30 or into other sprues, and permitted to solidify and cool. The hinged mould is then opened, the casting and mould facing removed or punched out and the cavities in the flask elements 20 and 22 cleaned out by sand blasting to remove undesired ceramic debris and to place the flask 18 in condition for reuse in forming another composite mould 30.

My invention provides for a rapid method of preparing a novel composite mould for precision metal casting operations which method and moulds are readily adaptable for use in continuous or semi-continuous foundry operations. The moulds of my invention have been prepared in the described embodiment with a gellable ceramic slurry, however, moulds lined with a thin layer of other materials such as waxes, plastics, clays, resins, metals, and the like, which materials are capable of being poured into the flask cavities and hardened can be prepared by my described operation.

What I claim is:

1. A composite mould which includes a pair of rigid backing elements adapted to permit their being placed in closed mating engagement, each backing element characterized by a contoured cavity in one face thereof, each cavity having a continuous relatively thin layer of facing material on the inner wall surface of the cavity whereby the elements on being placed in a closed mating position form an assembled composite mould having an opening for the introduction of materials to be molded and which composite mould presents an inner mould surface of facing material, and each element characterized further by an opening of substantial dimensions in the face of the contoured cavity, which opening extends into the cavity and extends approximately from one to the other end of the mold cavity, whereby such facing material can be punched out of the cavity.

2. A mould as described in claim 1 wherein the facing material is a refractory material.

3. A mould as described in claim 1 wherein the contoured cavity of each element is a centrally located cavity of about equal volume and dimension.

4. A mould as described in claim 1 wherein the mould includes additionally, means to secure the elements in a closed mating engagement.

5. A mould as described in claim 1 wherein the cavity is keyed to hold the facing layer.

6. A mould as described in claim 1 wherein the thickness of the continuous facing layer is varied to aid the directional solidification of molding material within the mould.

7. A composite mould which includes a pair of rigid backing elements adapted to permit their being placed in a closed fluid-tight mating engagement, each backing element characterized by a contoured cavity in one face thereof, each cavity having a continuous relatively thin layer of ceramic facing material on the inner wall surface of the cavity, the cavity dimensionally positioned and contoured to be placed over a pair of patterns from which the composite mould is to be formed and the thin ceramic facing conforming to the details of the corresponding patterns, being dimensionally stable at metal casting temperatures and having a microcrazed gas porous structure whereby the flask in a closed mating engagement provides an assembled composite flask having a thin interior wall of ceramic from which metal castings can be prepared by the introduction of a molten metal into a sprue opening of the composite mould, and each element having an opening of substantial dimensions approaching the outside dimensions of the contoured cavity, the opening being in the face of the backing element opposite to the face of the contoured cavity and extending into the cavity whereby the hardened ceramic facing material may be punched out of the cavity after use.

8. A contoured metal flask which includes a pair of metal backing elements connected and capable of being placed and secured in a closed fluid-tight mating engagement with each other, each element characterized by an adjacently positioned central cavity. dimensioned and contoured to be placed over a pattern plate assembly having a pair of patterns and to have a predetermined relatively thin space between the internal wall surfaces of the cavities and the external wall surfaces of the pattern, the contoured cavity being in one face of each backing element and each element characterized by an opening of substantial dimensions approaching the outside dimensions of the cavity in the face of the backing element opposite to the face of the contoured cavity, which opening extends into the cavity of each element whereby facing materials may be introduced rapidly into the space between the wall surfaces of the cavity and the hardened facing material removed quickly from the cavity by use of the opening.

9. A method of preparing a compisite mould which method comprises:
  providing a pattern plate assembly including a base plate and a pair of positioned patterns thereon;
  placing over the patterns a flask assembly including a pair of rigid backing elements, each element characterized by a contoured cavity dimensionally positioned and contoured to provide a reltaively thin facing cavity of predetermined thickness between the internal wall surfaces of the platens, and including an opening of substantial dimensions opposite the face of the cavity and extending into the contoured cavity and approximately from one to the other end of the mold cavity;
  introducing through the openings and into the facing cavity of each element at hardenable molding material;
  hardening the molding material; and
  stripping the flask assembly from the pattern plate assembly.

10. The method described in claim 9 which includes removing a portion of the molding material in the cavity prior to the material hardening thereby reducing the volume and weight of the molding material required.

11. The method described in claim 10 wherein the molding material is moved by inserting a form into the opening of at least one element to displace a portion of the molding material prior to hardening, thereby reducing the volume and weight of the material required to form a thin inner-facing in the cavity and removing the form prior to hardening of the material.

12. The method described in claim 9 which includes varying the thickness of the molding material in the mould cavity to provide for directional solidification of the material to be used in a subsequent casting operation.

13. The method described in claim 9 wherein the hardenable molding material is a gellable ceramic silicate slurry, and the method includes the step of subjecting the step of subjecting the gelled slurry to thermal shock after stripping the flask assembly from the pattern plate, thereby providing a composite mould having a thin facing of ceramic material.

14. The method of claim 9 which includes
  placing the elements of the mould in mating engagement to form a moulding cavity having the shape of the desired object to be cast;
  pouring molten metal into the mould cavity;
  cooling the metal to form the cast object;
  ejecting the hardened molding material and cast object from the mould cavity;
  recovering the cast object; and
  cleaning the facing debris from the internal cavity walls of each element.

15. The method of preparing a composite mould which method comprises:
  providing a pattern plate assembly including a base plate and a pair of positioned patterns thereon;
  placing over the patterns a flask assembly including a pair of rigid backing elements, each element characterized by a contoured cavity dimensionally positioned and contoured to provide a relatively thin facing cavity of predetermined thickness between the internal wall surfaces of the cavities and the external wall surfaces of the platens, and including an opening of substantial dimension opposite the face of the cavity and extending into the contoured cavity;
  introducing through the opening and into the facing cavity a gellable ceramic slurry comprising a hydrolyzed silicate, a graded refractory material and an accelerator;
  inserting a form into the opening of at least one element to displace a portion of the slurry;
  permitting the slurry to gel and harden;
  removing the form;
  stripping the flask assembly from the pattern plate assembly;
  igniting the volatile components of the slurry; and
  permitting these volatiles to burn until consumed thereby providing a composite mould having a thin facing layer of a microcrazed ceramic material.

16. The method described in claim 9 which includes the steps of punching out the hardened molding material by employing a punching tool against the exposed back surface of the hardened molding material in the opening opposite the face of the molding cavity, and recovering the material so removed.

References Cited by the Examiner

UNITED STATES PATENTS

| | | | |
|---|---|---|---|
| 2,445,141 | 7/1948 | Hardy | 22—126 |
| 2,886,865 | 5/1959 | Leisk | 22—193 |
| 2,931,081 | 4/1960 | Dunlop | 22—193 |
| 3,077,014 | 4/1963 | Jennings et al. | |
| 3,175,258 | 4/1965 | Rohrer et al. | 22—34 |

MARCUS U. LYONS, *Primary Examiner.*